United States Patent
Kim

(10) Patent No.: US 6,553,224 B1
(45) Date of Patent: Apr. 22, 2003

(54) METHOD FOR SYNCHRONIZING RADIO PORT AND RADIO INTERFACE UNIT IN WIRELESS LOCAL LOOP

(75) Inventor: Ik-Han Kim, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/524,245

(22) Filed: Mar. 13, 2000

(30) Foreign Application Priority Data

Mar. 12, 1999 (KR) ............................................. 99-8197

(51) Int. Cl.$^7$ ................................................. H04Q 7/20
(52) U.S. Cl. ..................... 455/426; 455/3.05; 455/502; 455/554
(58) Field of Search ................................ 455/3.05, 422, 455/426, 500, 502, 517, 554, 555, 557; 379/219, 229, 348; 370/320, 328, 335, 342, 347, 350, 441, 522; 375/222

(56) References Cited

U.S. PATENT DOCUMENTS

| | | | | |
|---|---|---|---|---|
| 5,533,027 A | * | 7/1996 | Akerberg et al. | 370/347 |
| 5,754,555 A | * | 5/1998 | Hurme et al. | 370/522 |
| 6,005,854 A | * | 12/1999 | Xu et al. | 370/335 |
| 6,052,573 A | * | 4/2000 | Ohmori et al. | 455/555 |
| 6,353,748 B1 | * | 3/2002 | Cho | 455/426 |
| 6,393,280 B1 | * | 5/2002 | Lee et al. | 455/3.05 |

FOREIGN PATENT DOCUMENTS

WO  WO 98/31179  * 7/1998 ............ H04Q/7/38

* cited by examiner

Primary Examiner—Quochien Vuong
(74) Attorney, Agent, or Firm—Steve Cha; Cha & Reiter

(57) ABSTRACT

Disclosed is a method for synchronizing a radio port and a radio interface unit (RIU) in a WLL system, in which an asynchronous system is used for communication among radio ports, capable of providing timing synchronization between each radio port and each RIU associated therewith. The method involves the steps of controlling a modulator equipped in the radio port to execute an internal timing alignment thereof, controlling a channel card controller equipped in the radio port to execute the timing alignment with the modulator, controlling the channel card controller to transmit the synchronous data to the radio interface unit via the modulator, controlling the radio interface unit to acquire a pilot signal transmitted from the radio port, and synchronizing the radio interface unit with the radio port associated with the acquired pilot signal based on the synchronous data received from the radio port. In accordance with the method, the WLL system obtains synchronization between each radio port and RIU associated therewith, thereby maintaining stability. Therefore, it is unnecessary to use a separate unit such as GPS receivers and is possible to provide an inexpensive and reliable WLL system.

15 Claims, 4 Drawing Sheets

METHOD FOR SYNCHRONIZING RADIO PORT AND RADIO INTERFACE UNIT IN WIRELESS LOCAL LOOP

CLAIM OF PRIORITY

This application makes reference to, incorporates the same herein, and claims all benefits accruing under 35 U.S.C. Section 119 from an application for METHOD FOR SYNCHRONIZING RADIO PORT AND RADIO INTERFACE IN WIRELESS LOCAL LOOP filed earlier in the Korean Industrial Property Office on Mar. 12, 1999 and there duly assigned Serial No. 36348197/1999.

BACKGROUND OF THE INVENTION

1. Field of the Invention

The present invention relates to a wireless local loop (WLL) system, and more particularly to a method for synchronizing a radio port and a radio interface unit (RIU) in a WLL system, in which an asynchronous technique is used for communication by radio ports for providing timing synchronization between each radio port and each RIU associated therewith.

2. Description of the Prior Art

In a public switched telephone network (PSTN), the connection between a subscriber and an exchange is established through a local loop constructed by subscriber lines. Generally, such subscriber lines are constructed using copper lines, coaxial cables, or optical fibers. Recently, a WLL has been developed which is constructed by wireless subscriber lines using the radio wave technique.

Such wireless WLL connects the subscriber lines, which are arranged around the radio port, within the radius of about 2 to 6 Km, to the radio port in a wireless fashion. Accordingly, the WLL provides reliability and flexibility as well as economical telephone service to the public. By virtue of such features, the WLL can make it possible to provide the data communication networks in underdeveloped areas where the installation of wire telephone networks is difficult or impossible.

FIG. 1 illustrates the configuration of a typical wireless local loop that is applicable to any type of wireless system with the wide-band code division multiple access (W-CDMA) technique, using the wireless local loops as subscriber lines between a fixed network and their respective subscribers. As shown in FIG. 1, a wireless local loop includes a plurality of radio interface units (RIUs) 120 each connected to one or more subscriber equipments (facsimile machines or wire telephones); a plurality of radio ports 130 each connected to one or more RIUs 120 via radio links; a radio port controller 140 connected with the radio ports 130 via communication lines; and, a local exchange 150 connected to the radio port controller 140 via a communication line. Further, the wireless local loop includes a public switched telephone network (PSTN) adapted to connect the local exchange 150 to another network.

In a mobile communication system using the CDMA technique, a plurality of subscribers is roamed freely between the service areas defined by different base stations. For this reason, all radio ports of such mobile communication system should be accurately synchronized together, in terms of timing, in order to provide an accurate call service to a roaming subscriber without the call interruption. To this end, all base stations, based on the CDMA technique, use the global positioning system (GPS) receivers, respectively, to receive universal time from a GPS satellite for synchronization.

However, the implementation of such GPS receivers to all base stations imposes a heavy burden on the server of the mobile communication system because those GPS receivers are very expensive. Furthermore, a possible failure of the GPS satellite may cause the shutdown of all base stations.

Meanwhile, in a WLL, the subscribers (that is, subscriber equipments and associated radio interface units) are stationary, thus requiring no mobility. Accordingly, it is not necessary to achieve the synchronization among radio ports. Thus, the W-CDMA technique applied to the advanced WLLs is not required for the radio ports to use the expensive GPS receivers as the asynchronous method is used for communication by the radio ports. Accordingly, for such WLLs, it is only necessary to provide the timing synchronization between each radio port and RIU associated therewith.

SUMMARY OF THE INVENTION

Therefore, the present invention has been made in view of the above-mentioned problems involved in the related art, thus the object of the invention is to provide a method for synchronizing a radio port and an RIU in a WLL system, in which the asynchronous system is used for communication by the radio ports, capable of providing timing synchronization between each radio port and RIU associated therewith, so that the WLL system can provide inexpensive and reliable service.

In accordance with the present invention, the above object is accomplished by providing a method for synchronizing a radio port and a radio interface unit in a wireless local loop system comprising the steps of: controlling a modulator equipped in the radio port to execute the internal timing alignment thereof; controlling a channel card controller equipped in the radio port to execute the timing alignment with the modulator; controlling the channel card controller to transmit a synchronous data to the radio interface unit via the modulator; controlling the radio interface unit to acquire a pilot signal transmitted from the radio port; and synchronizing the radio interface unit with the radio port associated with the acquired pilot signal based on the synchronous data received from the radio port.

In accordance with the present invention, the radio port uses an even-second clock signal and a 20 ms clock signal to create the synchronous data for providing the timing information associated with the clock signals. The radio port then transmits the synchronous data to the radio interface unit, which in turn is synchronized with the system time of the radio port based on the synchronous data received thereto. To this end, the radio port creates the synchronous data in sync with the even-second clock signal and the 2 ms clock signal.

In a WLL system using the CDMA technique, each radio port transmits the system synchronous data to a radio interface unit associated therewith via a synchronous channel. The channel card of the radio port includes a plurality of modems each consisting of a modulator and a demodulator. The modem is controlled by a channel card controller, and the modem creates synchronous data under the control of the channel card controller.

BRIEF DESCRIPTION OF THE DRAWINGS

The above objects and other advantages of the present invention will become more apparent by describing in detail the preferred embodiment thereof in reference to the attached drawings, in which.

DETAILED DESCRIPTION OF THE PREFERRED EMBODIMENT

Hereinafter, preferred embodiments of the present invention will be described in detail, in conjunction with the annexed drawings. In the following description made in conjunction with a preferred embodiment of the present invention, a variety of specific elements are described. A description of these elements has been made only for better understanding of the present invention. Those skilled in the art will appreciate that the present invention can be implemented without using the above-mentioned specific elements. For the purpose of clarity, a detailed description of known functions and configurations incorporated herein will be omitted as it may make the subject matter of the present invention unclear.

Figure 1:
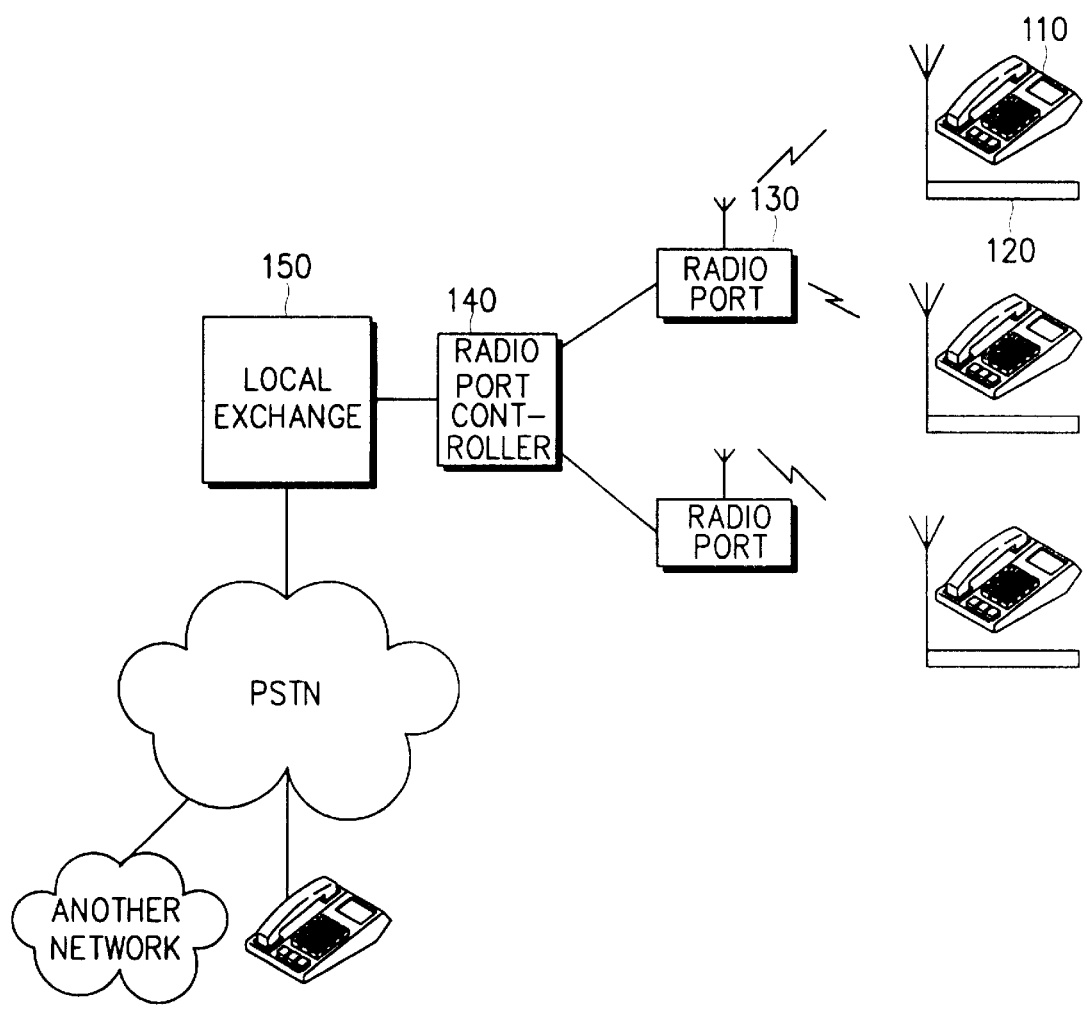
FIG. 1 is a schematic view illustrating a typical WLL system.
Figure 2:
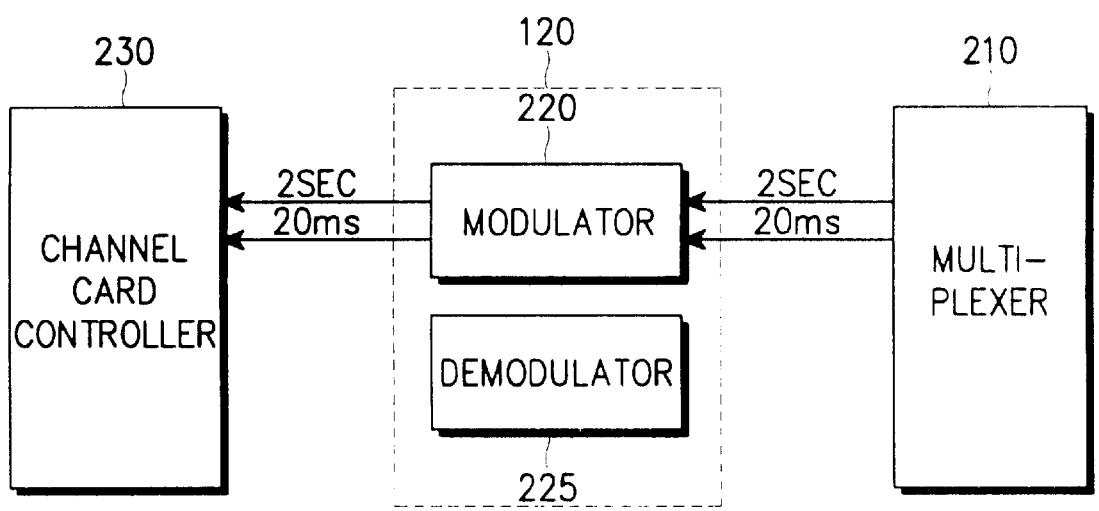
FIG. 2 is a block diagram illustrating the channel card equipped in a radio port to which the present invention is applied.

FIG. 2 is a block diagram illustrating a channel card equipped in a radio port to which the present invention is applied. As shown in FIG. 2, the channel card includes a multiplexer 210 connected to a radio port controller, a modulator 220 coupled to the multiplexer 210, and a channel card controller 230 for controlling the modulator 220. The modulator 220 constitutes a modem along with a demodulator 225.

The multiplexer 210 generates an even-second clock signal at an interval of 2 seconds and a 20 ms clock signal at an interval of 20 ms, and applies these generated clock signals to the modulator 220. Using the clock signals received from the multiplexer 210, the modulator 220 performs the internal timing alignment. The modulator 220 is synchronized to the timing so that the two clock signals are accurately aligned with each other to carry out the communication with the associated RIUs. The modulator 220 also serves to supply the two clock signals to the channel card controller 230, which in turn, creates the synchronous data in sync with those clock signals.

The channel card controller 230 designates the operation mode of the modem constituted by the modulator 220 and the demodulator 225. Under the control of the channel card controller 230, the modem operates in a mode corresponding to a pilot channel, a synchronous channel, a paging channel, or a traffic channel.

Both the modem and the channel card controller 230 have a 20 ms clock count register in which the count value is incremented by a value of 1 at interval of 20 ms. The count value of the 20 ms clock count register is cleared with a value of 0 at interval of 2 seconds, after being incremented by a value of 1 at interval of 20 ms. Using the 20 ms clock count register, both the modulator 220 and the channel card controller 230 can conduct an accurate synchronized operation.

Figure 3:
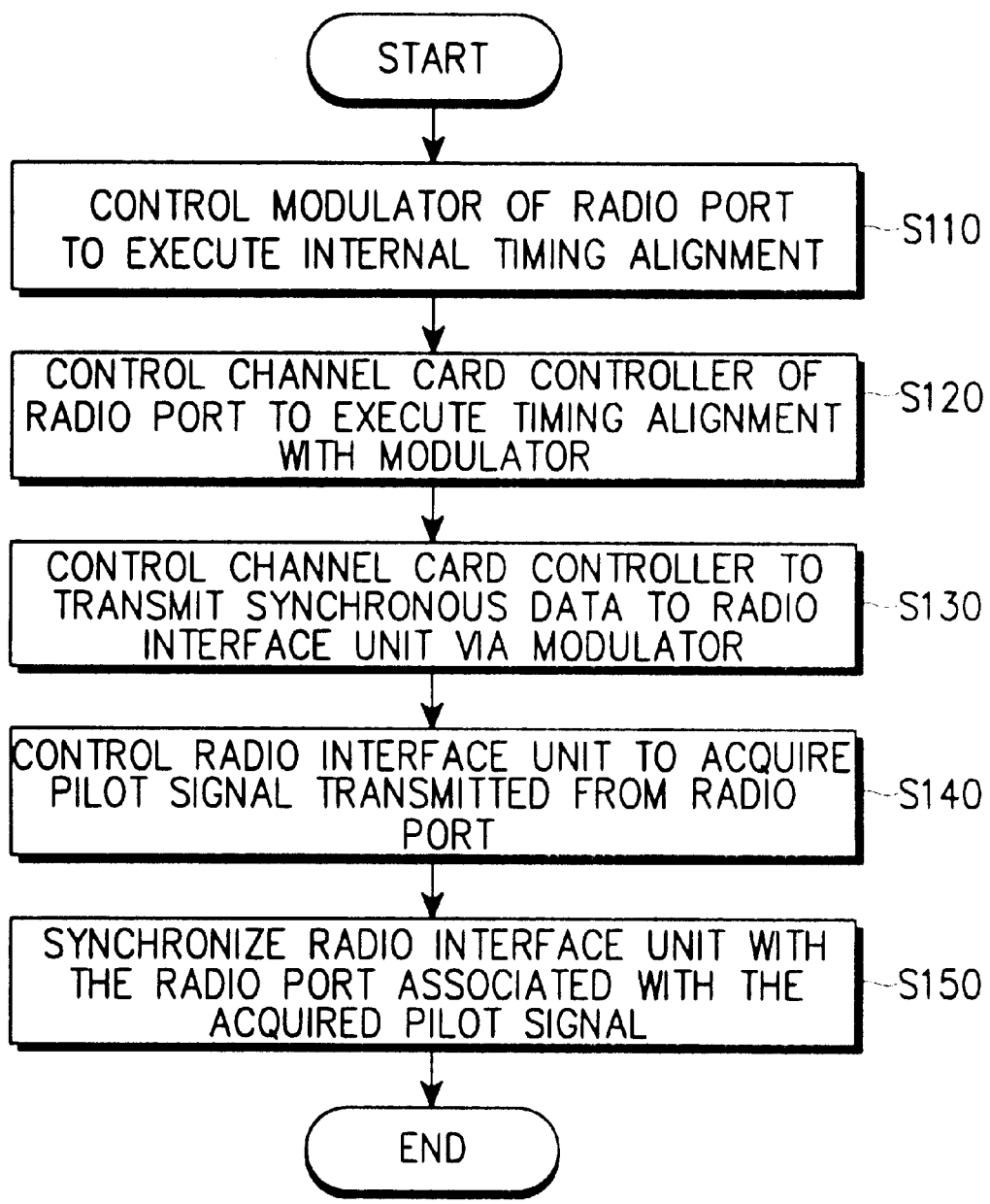
FIG. 3 is a flow chart illustrating a method for synchronizing the radio port having the channel card configuration of FIG. 2 and the RIU associated therewith in accordance with the present invention; and, FIG. 4 is a timing diagram of synchronous channel time slots in accordance with the present invention.

FIG. 3 is a flow chart illustrating the method in accordance with the present invention for synchronizing a radio port having the above-mentioned channel card configuration and the RIU associated therewith. Referring to FIG. 3, the synchronizing method involves the steps of controlling the modulator of the radio port to execute the internal timing alignment (Step s110), controlling the channel card controller of the radio port to execute the timing alignment with the modulator (Step s120), controlling the channel card controller of the radio port to transmit synchronous data to the RIU via the modulator (Step s130), controlling the RIU to acquire a pilot signal transmitted from the radio port (Step s140), and synchronizing the RIU with the radio port associated with the acquired pilot signal (Step s150). Now, the synchronizing method will be described in detail in conjunction with FIG. 4.

The modem of the radio port, in particular, the modulator 220 adapted to transmit the synchronous data to the RIU, receives an even-second clock signal and a 20 ms clock signal from the multiplexer 110, thereby conducting the internal timing alignment (Step s110). When the even-second clock pulse is initially generated after the initialization of the modulator 220, the modulator 220 clears the count value of the 20 ms clock count register, included therein, to a value of 0. Thereafter, the modulator 220 increments the count value of the 20 ms clock count register by a value of 1 every time that the 20 ms clock pulse is generated. When an even-second clock pulse is subsequently generated, the count value of the 20 ms clock count register is cleared again to a value of 0.

In accordance with the above-mentioned operations, the count value of the 20 ms clock count register is sequentially incremented from a value of 0 to 99, while being cleared by a value of 0 every time the even-second clock pulse is generated. In accordance with the above-mentioned procedure, the radio port completes the internal synchronization of the modulator 220 based on the even-second clocks, in terms of hardware.

Thereafter, the modulator 220 supplies the even-second clock signal and the 20 ms clock signal to the channel card controller 230. Based on the even-second clock signal and the 20 ms clock signal, the channel card controller 230 attempts to obtain the timing alignment with the modulator 220 (Step s120). The channel card controller 230 has a modem control (MC) task function to obtain the timing synchronization with the modulator 220 while controlling the modem. To this end, the MC task processes an even-second interrupt signal and the 20 ms interrupt signal, thereby providing a reference timing for the radio port.

The MC task includes an even-second interrupt sub-routine which is a handler for processing the even-second interrupt signal generated from the channel card controller 230. This even second interruption sub-routine provides the reference timing for the radio port system.

When the number of 20 ms clock pulses generated between the successive even-second clock pulses do not correspond to the value of 99, the even-second interrupt sub-routine adjusts the count value of the 20 ms clock count register included in the channel card controller 230. That is, when the even-second interrupt signal is generated, the even-second interrupt sub-routine of the MC task clears the count value of the 20 ms clock count register included in the channel card controller to the value of 0.

The MC task also includes a 20 ms interrupt sub-routine, which is a handler for processing the 20 ms interrupt signal applied to the channel card controller 230. The 20 ms interrupt sub-routine provides basic timing for the radio port system. When the 20 ms interrupt signal is generated, the 20 ms interrupt sub-routine increments the count value of the 20 ms clock count register included in the channel card controller 230 by a value of 1, and executes a modulo operation for the resultant count value using a value of 100.

Every time that an even-second interrupt signal is generated, the 20 ms interrupt sub-routine reads the count value of the 20 ms clock count register from the modulator 220, then compares the read value of the channel card controller obtained after the above mentioned modulo operation using a value of 100, that is, the modulo obtained after the above-mentioned modulo operation. When the compared two values are different from each other, the adjustment of the count value of the 20 ms clock count register of the channel card controller is conducted again. However, when the compared two values correspond to each other, the 20 ms interrupt subroutine provides a timing value to a variety of application tasks, the RIUs.

In accordance with the above-mentioned procedure, the MC task maintains an accurate timing value so that the application tasks always obtain accurate timing.

After the channel card controller 230 of the radio port completes the timing alignment with the modulator 220, it generates the synchronous data and transmits it to the RIU via the modulator 220 (Step s130). The channel card controller 230 is provided with a sync task adapted to create the synchronous data.

In response to a synchronous channel configuration message from a resource manager, which is the main control processor of the radio port, the channel card controller 230 creates a sync task. The sync task stores the channel information (the Hadamard code and the gain) received from the resource manager, executes its initialization to set up the modulator 220 based on the stored channel information.

When the sync task receives a message to create the sync data from the resource manager, it creates a synchronous data, an over-the-air (OTA) message, to be transmitted to the RIU. In order to allow the RIU to be synchronized with the system time of the radio port, the synchronous data transmitted from the radio port has a bit size of about 22 bytes.

As the transfer rate of the synchronous channel used in the CDMA system is 8 kbps, the data transfer time is about 22 ms. Accordingly, the synchronous data having a length of 22 ms is transmitted using the two time slots since each of the time slot corresponds to 20 ms.

Moreover, the synchronous channel transmits the synchronous data in an encoded state at its 80 ms boundary. The procedure of transmitting the synchronous data will now be described in conjunction with FIG. 4.

Figure 4:
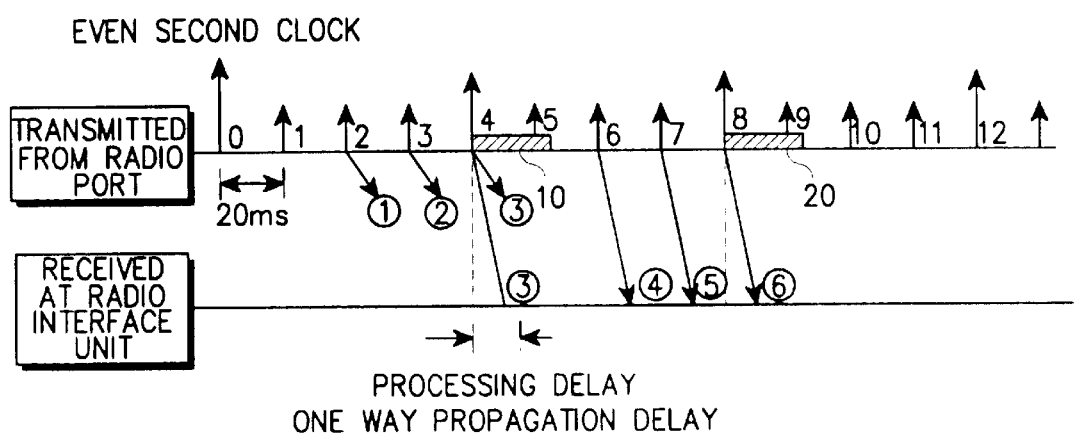

At the time indicated by the point (1) of FIG. 4, the radio port creates the synchronous data, that is, an OTA message to be transmitted to the RIU. Among the parameters of the OTA data to be transmitted to the RIU, a parameter of 20 MS_BST_SEQ_NO, which is indicative of the system time of the radio port, is advanced by a predetermined period of time to provide the redundancy for allowing the RIU to be synchronized with the radio port.

The parameter, 20 MS_BST_SE_NO, advanced in accordance with the present invention can be expressed as the following equation:

$$20\_MS\_BST\_SEQ\_NO = 2 \text{ time slots} + 5 \text{ time slots.} \quad [\text{EXPRESSION 1}]$$

According to the parameter, 20_MS_BST_SEQ_NO, set as the above-mentioned Expression 1, the radio port analyzes the synchronous data received at the seventh time slot.

At the time indicated by the point (2) of FIG. 4, the radio port writes the created synchronous data in the encoder buffer included in the modulator 220.

At the time indicated by the point 3 of FIG. 4, the radio port begins to transmit the synchronous data written in the encoder buffer after encoding it. This synchronous data, which is denoted by the reference numeral 10 in FIG. 4, is transmitted using the fourth and fifth time slots. Taking into consideration the processing delay required for the radio port to encode the synchronous data and the one way propagation delay of the synchronous data during its propagation over the air, the RIU begins to receive the synchronous data at the point of time indicated by the point 4 of FIG. 4.

As mentioned above, the effective bits of the OTA message are transmitted using two time slots. In a CDMA system, however, the messages via the synchronous channel are transmitted using four time slots. Accordingly, the radio port transmits a null message 20, containing no effective bit, through the remaining two time slots allocated for the synchronous messages. Such null message is transmitted to the RIU using the eighth and the ninth time slots.

In order to achieve the synchronization with the radio port, the RIU first locks the pilot signal transmitted from the radio port (Step s140). Thereafter, the RIU conducts the timing synchronization with the radio port based on information contained in the synchronous data received from the radio port (Step s150).

As the respective radio ports of the CDMA system transmit the intrinsic pilot signals, the RIU distinguishes those radio ports from one another based on the intrinsic pilot signals. When the RIU is turned on, it conducts its initialization by itself and checks whether the pilot signals having an effective intensity are received from the nearby radio ports. When pilot signals having the effective intensity are received from the near radio ports, the RIU selects one of the radio ports transmitting a pilot signal with the highest intensity.

The procedure for selecting the radio port, with which the RIU is synchronized, based on the pilot signals is referred to as a "pilot lock". The RIU, after completing the pilot lock function, then waits for the acquisition of a synchronous message since it has to be synchronized with the system time of the radio port through the synchronous channel.

When the RIU receives the synchronous data from the radio port, it determines at the time indicated by the point 4 of FIG. 4 whether the received synchronous data is normally received. If the received synchronous data is abnormal, the RIU then waits for the subsequent synchronous data. On the other hand, if the received synchronous data is normal, the RIU then extracts the system time 20MS_BST_SEQ_NO contained in the synchronous data, and subsequently takes the modulo obtained after a modulo operation for the extracted system time using the value of 100. That is, when the radio port transmits the count value of the 20 ms, the received 20 ms unit timing value of the sync message is performed by a modulo operation of modulo 100. The modulo is then set as the initial count value of the 20 ms clock count register so that the timing of the radio port could be synchronized with the timing of the RIU.

The system time 20MS_BST_SEQ_NO of the synchronous message initially transmitted from the radio port, after the generation of the even-second clock, is set to a value corresponding to 7 time slots. Accordingly, the RIU sets the initial count value of its 20 ms count register to the value of 7 at the time indicated by the point 5 of FIG. 4. As a result, the RIU is synchronized with the radio port, in terms of a timing, at the time indicated by the point 6 of FIG. 4.

After the RIU is synchronized with the radio port, in terms of timing, at the point of time indicated by the point 6 of FIG. 4, it can perform the synchronized communication with the radio port.

In accordance with the present invention as mentioned above, various effects are obtained.

For example, in accordance with the present invention, the WLL system can perform its most basic operation and maintain stability by synchronization between each radio port and each RIU associated therewith. In accordance with the present invention, therefore, it is unnecessary to use any separate unit, for example, GPS receivers for the synchronization of the system. As a result, it is possible to provide an inexpensive and reliable WLL system.

While the present invention has been particularly shown and described with reference to a particular embodiment thereof, it will be understood by those skilled in the art that various changes in form and detail may be affected therein without departing from the scope of the invention as defined by the appended claims.

What is claimed is:

1. A method for synchronizing a radio port and a radio interface unit (RIU) in a wireless local loop system (WLL), comprising the steps of:
   (a) controlling a modulator provided in the radio port to execute an internal timing alignment thereof;
   (b) controlling a channel card controller provided in the radio port to execute the timing alignment with the modulator;
   (c) controlling the channel card controller to transmit a synchronous data to the radio interface unit via the modulator;
   (d) controlling the radio interface unit to acquire a pilot signal transmitted from the radio port; and,
   (e) synchronizing the radio interface unit with the radio port associated with the acquired pilot signal based on the synchronous data received from the radio port.

2. The method according to claim 1, wherein the step (a) of controlling the modulator to execute the internal timing alignment comprises the steps of:
   allowing the modulator of the radio port to receive, from a multiplexer, an even-second clock signal generated at an interval of 2 seconds and a 20 ms clock signal generated at interval of 20 ms;
   determining whether the pulse of the even-second clock signal is generated prior to an initialization of the radio interface unit;
   if it is determined that the even-second clock pulse is generated prior to the initialization of the radio interface unit, initializing a 20 ms clock count register provided in the modulator by clearing the 20 ms clock count register with a value of 0;
   determining whether the pulse of the 20 ms clock signal is generated;
   if it is determined that the 20 ms clock pulse is generated, incrementing a count value of the 20 ms clock count register by a value of 1;
   determining whether a subsequent pulse of the even-second clock signal is generated;
   if no subsequent pulse of the even-second clock signal is generated, repeating the step of incrementing the count value of the 20 ms clock count register in response to a next 20 ms clock pulse generated; and,
   if the subsequent pulse of the even-second clock signal is generated, clearing the count value of the 20 ms clock count register with a value of 0 for the initialization of the 20 ms clock count register.

3. The method according to claim 2, wherein the step (b) of controlling the channel card controller to execute the timing alignment with the modulator comprises the steps of:
   allowing the channel card controller to receive the even-second clock signal and the 20 ms clock signal from the modulator; and,
   clearing the count value of the 20 ms clock count register whenever the pulse of the even-second clock signal is generated.

4. The method according to claim 3, wherein the step (b) of controlling the channel card controller to execute the timing alignment with the modulator further comprises the steps of:
   controlling the channel card controller to determine whether the pulse of the 20 ms clock signal is generated;
   if it is determined that the pulse of the 20 ms clock signal is generated, incrementing the count value of a 20 ms clock count register provided in the channel card controller by a value of 1;
   reading out the count value of the 20 ms clock count register provided in the modulator;
   comparing the read value of the 20 ms clock count register of the modulator with the count value of the 20 ms clock count register of the channel card controller provided by a modulo operation using a value of 100; and,
   if the compared values do not correspond to each other, re-adjusting the count value of the 20 ms clock count register provided in the channel card controller.

5. The method according to claim 4, wherein the step of re-adjusting the count value of the 20 ms clock count register comprises the step of clearing the count value of the 20 ms clock count register of the channel card controller whenever the pulse of the even-second clock signal is generated.

6. The method according to claim 1, wherein the step (c) of controlling the channel card controller to transmit the synchronous data to the radio interface unit comprises the steps of controlling the radio port to generate the synchronous data at an interval of 80 ms and to transmit the generated synchronous data.

7. The method according to claim 6, wherein the generation of the synchronous data is performed at 40 ms prior to the transmission of the synchronous data.

8. The method according to claim 7, wherein the synchronous data contains information about advanced system time for providing a redundancy adapted to allow the radio interface unit to be synchronized with the radio port.

9. The method according to claim 8, wherein the system time information corresponds to a sum of 2 time slots and 5 time slots, wherein each of the time slots corresponds to 20 ms.

10. The method according to claim 1, wherein the step (c) of controlling the channel card controller to transmit the synchronous data to the radio interface unit comprises the steps of:
    controlling the channel card controller of the radio port to receive a channel information;
    setting up the modulator responsive to the received channel information; and,
    controlling the radio port to generate the synchronous data and to transmit the created synchronous data to the radio interface unit.

11. The method according to claim 10, wherein the step of controlling the radio port to create synchronous data and to transmit the created synchronous data to the radio interface unit comprises the steps of:
    creating synchronous data, to be transmitted to the radio interface unit, at a boundary of 40 ms after the pulse of the even-second clock signal is generated;

recording the created synchronous data in an encoder buffer, included in the modulator, at a boundary of 60 ms after the generation of the even-second clock pulse; and, encoding the synchronous data stored in the encoder buffer at a boundary of 80 ms after the generation of the even second clock pulse and transmitting the encoded synchronous data to the radio interface unit.

12. The method according to claim 11, wherein the creation of the synchronous data is made under the condition in which the information about system time is set to correspond to a sum of 2 time slots and 5 time slots.

13. The method according to claim 1, wherein the step (d) of controlling the radio interface unit to acquire a pilot signal transmitted from the radio port comprises the steps of:

initializing the radio interface unit when the radio interface unit is activated;

detecting the pilot signal received from the radio port after the initialization of the radio interface unit and obtaining a pilot lock with the radio port; and, controlling the radio interface unit to wait for the synchronous data transmitted from the radio port after obtaining the pilot lock.

14. The method according to claim 1, wherein the step (e) of synchronizing the radio interface unit with the radio port comprises the steps of:

determining whether the synchronous data from the radio port is received normally;

if the received synchronous data is received normally, waiting for a subsequent synchronous data;

if the received synchronous data is received normally, extracting a system time contained in the synchronous data and performing a modulo operation of the extracted system time using a value of 100;

setting the modulo obtained from the modulo operation as an initial count value of the 20 ms clock count register provided in the radio interface unit;

controlling the radio interface unit to generate a 20 ms clock signal based on the received synchronous data;

incrementing the count value of the 20 ms clock count register of the radio interface unit by a value of 1 every time the 20 ms clock signal is generated;

clearing the count value of the 20 ms clock count register of the radio interface unit with a value of 0 at the time the count value reaches the value of 100; and, allowing the radio interface unit to be synchronized with the radio port based on the count value of the 20 ms clock count register thereof.

15. The method according to claim 13, wherein the step of synchronizing the radio interface unit with the radio port comprises the steps of:

determining whether the synchronous data from the radio port is received normally;

if the received synchronous data is received normally, waiting for a subsequent synchronous data;

if the received synchronous data is received normally, extracting a system time contained in the synchronous data and performing a modulo operation of the extracted system time using a value of 100;

setting the modulo obtained from the modulo operation as an initial count value of the 20 ms clock count register provided in the radio interface unit;

controlling the radio interface unit to generate a 20 ms clock signal based on the received synchronous data;

incrementing the count value of the 20 ms clock count register of the radio interface unit by a value of 1 every time that the 20 ms clock signal is generated;

clearing the count value of the 20 ms clock count register of the radio interface unit with a value of 0 at a point of time when the count value reaches the value of 100; and, allowing the radio interface unit to be synchronized with the radio port based on the count value of the 20 ms clock count register thereof.

* * * * *